(12) United States Patent
Grossmann et al.

(10) Patent No.: US 10,479,206 B2
(45) Date of Patent: Nov. 19, 2019

(54) METHOD FOR SWITCHING AN OPERATING STATE OF AN ELECTRIC MACHINE AND DEVICE FOR SWITCHING AN OPERATING STATE OF AN ELECTRIC MACHINE

(71) Applicant: Robert Bosch GmbH, Stuttgart (DE)

(72) Inventors: Ekard Grossmann, Stuttgart (DE); Marcus Abele, Schwieberdingen (DE); Torsten Heidrich, Vaihingen/Enz (DE)

(73) Assignee: Robert Bosch GmbH, Stuttgart (DE)

(\*) Notice: Subject to any disclaimer, the term of this patent is extended or adjusted under 35 U.S.C. 154(b) by 0 days.

(21) Appl. No.: 15/521,949

(22) PCT Filed: Sep. 18, 2015

(86) PCT No.: PCT/EP2015/071427
§ 371 (c)(1),
(2) Date: Apr. 26, 2017

(87) PCT Pub. No.: WO2016/066330
PCT Pub. Date: May 6, 2016

(65) Prior Publication Data
US 2017/0313193 A1 Nov. 2, 2017

(30) Foreign Application Priority Data
Oct. 31, 2014 (DE) .................. 10 2014 222 256

(51) Int. Cl.
*B60L 7/00* (2006.01)
*H02P 3/22* (2006.01)
(52) U.S. Cl.
CPC ............... *B60L 7/003* (2013.01); *H02P 3/22* (2013.01)

(58) Field of Classification Search
USPC ........... 318/400.31, 299, 515, 516, 528, 368
See application file for complete search history.

(56) References Cited

U.S. PATENT DOCUMENTS 9,496,810 B2 \* 11/2016 Raichle ................ B60L 3/0061
9,634,553 B2 \* 4/2017 Roessler ............. B60L 11/1803
(Continued)

FOREIGN PATENT DOCUMENTS

DE 102011017712 10/2012
DE 102011081173 2/2013
(Continued)

OTHER PUBLICATIONS

International Search Report for Application No. PCT/EP2015/071427 dated Dec. 9, 2015 (English Translation, 2 pages).

*Primary Examiner* — Jorge L Carrasquillo
(74) *Attorney, Agent, or Firm* — Michael Best & Friedrich LLP

(57) ABSTRACT

The invention relates to a method and to a device for changing from the idle operating state of an electric motor (5) having three phase terminals (5-1, 5-2, 5-3) to a short-circuit operating state. Thereby significant voltage rises are avoided. For this purpose, after receiving (120) a request for changing of the operating state of the electric motor (5) to the short-circuit operating state, three switching elements (1-1, 1-2, 1-3) are closed. Thereby the switching elements (1-1, 1-2, 1-3) are at least partially closed successively and the times of closing the individual switching elements are predetermined as a function of control parameters of the electric motor.

17 Claims, 3 Drawing Sheets

(56) References Cited

U.S. PATENT DOCUMENTS

| | | | |
|---|---|---|---|
| 2010/0060222 A1* | 3/2010 | Kezobo | G01R 31/42 318/490 |
| 2011/0187308 A1* | 8/2011 | Suhama | H02P 27/04 318/798 |
| 2012/0068644 A1* | 3/2012 | Tsuji | B60L 3/003 318/400.21 |
| 2013/0307446 A1* | 11/2013 | Ichikawa | H02P 3/22 318/362 |
| 2014/0191700 A1 | 7/2014 | Eberlein et al. | |
| 2015/0091480 A1* | 4/2015 | Kischka | H02P 3/18 318/374 |
| 2015/0214858 A1* | 7/2015 | Raichle | B60L 3/04 363/131 |
| 2016/0375774 A1* | 12/2016 | Lauter | B60L 3/0076 318/400.22 |

FOREIGN PATENT DOCUMENTS

| | | |
|---|---|---|
| DE | 102011086079 | 5/2013 |
| DE | 102012101508 | 8/2013 |

* cited by examiner

METHOD FOR SWITCHING AN OPERATING STATE OF AN ELECTRIC MACHINE AND DEVICE FOR SWITCHING AN OPERATING STATE OF AN ELECTRIC MACHINE

BACKGROUND OF THE INVENTION

The present invention relates to a method and a device for switching from the freewheeling operating state of an electric machine to the short-circuit operating state.

Furthermore, the invention relates to a power converter and also an electrically driven motor vehicle comprising a device for switching from the freewheeling operating state of an electric machine to the short-circuit operating state.

Electric machines, such as permanently excited synchronous machines, for example, are used in numerous technical fields. By way of example, such permanently excited synchronous machines are used in motor vehicles. For safety reasons it is necessary here to take precautions for a safe operating state in the case of a fault. One possibility for a safe operating state is the so-called active short circuit, for example. In this case, the phase terminals of the electric machine are short-circuited simultaneously by means of suitable switching elements. A further safe operating state is the so-called freewheeling. In this case, all the terminals of the electric machine are isolated from one another and no active driving of the electric machine with a voltage takes place.

The German patent application DE 10 2011 081 173 A1 discloses a device and a method for setting operating states of an inverter which drives an electric machine. In this case, it is possible to switch to freewheeling or an active short circuit by means of the inverter depending on the rotational speed of the electric machine.

During the freewheeling operating state of an electric machine, the induced voltage rises continuously as the rotational speed increases. The closing of the power switches of the inverter in order to change from the freewheeling operating state to the short-circuit operating state is accompanied by the occurrence of high overvoltages and/or overcurrents between the inverter and the electric machine in the individual phases. These can lead to damage or destruction of the components of the inverter or of the components connected to the inputs and outputs.

Therefore, there is a need for a method and a device in which the switching, the transition or the change of the operating state from freewheeling to the active short circuit is implemented in such a way as to minimize the overvoltages and/or overcurrents at and in the inverter and in the electric machine.

SUMMARY OF THE INVENTION

In accordance with one aspect, the present invention provides to that end a method for switching from the freewheeling operating state of an electric machine having three phase terminals to a short-circuit operating state, comprising the following steps: providing a first switching element with a first freewheeling diode between a first phase terminal of the electric machine and a node; providing a second switching element with a second freewheeling diode between a second phase terminal of the electric machine and the node; providing a third switching element with a third freewheeling diode between a third phase terminal of the electric machine and the node; receiving a request for switching the operating state of the electric machine to the short-circuit operating state; closing the switching elements, wherein closing the individual switching elements is effected at least partly successively and the points in time of closing the individual switching elements are predefined depending on at least one drive parameter of the electric machine.

In accordance with a further aspect, the present invention provides a device for switching from the freewheeling operating state of an electric machine comprising three phase terminals to a short-circuit operating state, comprising a first switching element, which is designed to electrically connect a first phase terminal of the electric machine to a node, wherein the first switching element comprises a first freewheeling diode; a second switching element, which is designed to electrically connect a second phase terminal of the electric machine to the node, wherein the second switching element comprises a second freewheeling diode; a third switching element, which is designed to electrically connect a third phase terminal of the electric machine to the node, wherein the third switching element comprises a third freewheeling diode; and a drive device, which is designed to receive a request for switching the operating state of the electric machine to the short-circuit operating state, and to output control signals for closing the switching elements, wherein the control signals for closing the individual switching elements are output at least partly successively and the points in time of switching on the individual switching elements are predefined depending on at least one drive parameter of the electric machine.

Furthermore, the present invention provides a power converter and also an electrically driven motor vehicle comprising a device for switching from the freewheeling operating state of an electric machine to the short-circuit operating state.

The method is analogously furthermore also useable for machines having more than three phases.

One concept underlying the present invention is that the transition from the freewheeling operating state to the short-circuit operating state takes place via an intermediate state, in which firstly only two phases are conductively connected to one another. A transition from the freewheeling operating state, via an intermediate state, the partial-phase short circuit, to the all-phase short circuit thus takes place. No closed conductive connection between the three phase terminals of the electric machine is present in the freewheeling operating state. In the partial-phase short circuit, only two of the three phase terminals of the electric machine are conductively connected to one another, that is to say short-circuited. In the all-phase short circuit, all three phase terminals are conductively connected to one another, that is to say short-circuited. In the present use, in particular, the freewheeling is switched to the three-phase short circuit via a two-phase short circuit.

The short-circuiting of two of the three phases results in a closed oscillating two-phase system. The points in time of closing the individual switching elements are predefined depending on at least one drive parameter of the electric machine. In order to form a two-phase system from the second and third phases, for closing the third switching element in the third phase a point in time is chosen, for example, at which no current flows through the first phase of the three-phase system since the associated freewheeling diode is turned off at this point in time. By closing the third switching element in the third phase and if a current flow through the second freewheeling diode of the second phase is possible at this point in time, a current flow in the third and second phases is made possible. A partial-phase short circuit in phases two and three is present. The current then flows through the closed switch in phase three and through the freewheeling diode in phase two, said freewheeling diode bridging in particular the still open second switching element. In the case of this partial-phase short-circuiting neither overvoltages nor overcurrents arise, or these are minimized.

The switching from the partial-phase short circuit to the all-phase circuit is described below. To that end, the first switching element is to be closed in the first phase. Said first switching element is closed at a point in time at which a virtually maximum voltage is present at the open first switch, such that closing the switching element causes a current flow which in the ideal case corresponds to the current flow that has settled in the steady state. This is the case if the voltage across the impedance of the first phase or the voltage across the first switch it is as far as possible maximal.

The second switching element in phase two is closed within the time period during which the current flows via the freewheeling diode in the phase two. Consequently, parallel closing of the switching element does not cause any change in the current flow in phase two.

Consequently, upon the short-circuiting both of the first switching element and of the second switching element in phases one and two, once again no overvoltages and no overcurrents arise, or these are minimized.

Therefore, by means of this switching sequence, a transition from a freewheeling operating state to a short-circuit operating state is created in which overvoltages or overcurrents that are otherwise typical do not arise since the points in time of closing the individual switching elements of the individual phases are predefined depending on at least one drive parameter of the electric machine such that ideally upon closing as far as possible the maximum voltage is present across the corresponding impedances.

A possibility for switching from the freewheeling operating state to the short-circuit operating state of an electric machine is thus made available which does not cause destruction or damage on the components.

In a further embodiment of the invention, drive parameter of the electric machine should be understood to mean in particular a value or a profile of an electrical voltage of the electric machine, that is to say, for example, an induced star voltage, a stator phase voltage, a rotor voltage, a conductor-conductor voltage, a voltage across the impedance of a phase of the electric machine, a voltage across a power switch of a phase of the electric machine, or a voltage across a freewheeling diode of a phase of the electric machine. Drive parameter of the electric machine should be understood in particular also to mean a value or a profile of a rotor angle of the rotor of the electric machine, for example a corresponding resolver signal or some other parameter on the basis of which a value or a profile of an electric voltage of the electric machine or the rotor angle of the rotor of an electric machine can be deduced.

It is only with knowledge of at least one of the above-mentioned drive parameters of the electric machine that the different, at least partly successive points in time for closing the switching elements can be determined and predefined such that, upon short-circuiting of the electric machine, no overvoltages and no overcurrents arise, or these can be minimized. By way of example, depending on the rotor angle, the time segment or a point in time is determined during which, in the first phase, no current flows on account of the instantaneously blocking freewheeling diode of this phase. The third phase is short-circuited by the closing of the third switching element during this time segment. Advantageously, upon the short-circuiting of the third phase, neither overvoltages nor overcurrents arise or these are minimized.

In a further embodiment of the invention, the third switching element is closed at a first point in time, at which the drive parameter corresponds to a value which corresponds to a rotor angle from the range of 270° to 90°, in particular 320° to 40°, or corresponds in particular to a rotor angle of 0°.

If the rotor angle corresponds to a value from the range of 270° to 90°, in particular 320° to 40°, or is in particular 0°, in the first phase virtually no current, or no current, flows through the instantaneously blocking freewheeling diode of this phase. The third phase is short-circuited by the closing of the associated third switching element during this time segment.

Advantageously, upon the short-circuiting of the third phase, neither overvoltages nor overcurrents thus arise, or these are minimized.

In a further embodiment of the invention, the second switching element is closed at a second point in time, at which the drive parameter corresponds to a value which corresponds to a rotor angle from the range of 270° to 180°, in particular 320° to 130°, or corresponds in particular to a rotor angle from the range of 0° to 90°.

If the rotor angle corresponds to a value from the range of 270° to 180°, in particular 320° to 130° or in particular of 0° to 90°, in the second phase current flows through the freewheeling diode of this phase. Upon the closing of the second switching element in parallel with the instantaneously conducting freewheeling diode, the second phase is permanently short-circuited by the closing of the associated second switching element. The current flow through phase two is not influenced by the closing of the second switching element on account of the parallel current conduction through the freewheeling diode at a point in time within the range in which the rotor angle corresponds to a value from the range of 270° to 180°, in particular 320° to 130°, or in particular of 0° to 90°. Advantageously, upon the short-circuiting of the second phase, neither overvoltages nor overcurrents thus arise, or these are minimized.

In a further embodiment of the invention, the first switching element is closed at a third point in time, at which the drive parameter corresponds to a value which corresponds to a rotor angle from the range of 0° to 180°, in particular 50° to 130°, or corresponds in particular to a rotor angle of 90°.

If the rotor angle corresponds to a value from the range of 0° to 180°, in particular 50° to 130°, or is in particular 90°, the induced star voltage of the first phase is high or maximal. At this point in time, the current through the phase is low or minimal. This is therefore the optimum point in time for closing the first switching element since no current flow is adversely affected by the switching-on.

Advantageously, upon the short-circuiting of the second phase, neither overvoltages nor overcurrents thus arise, or these are minimized.

In a further embodiment of the invention, the second switching element is closed at a second point in time corresponding to the first point in time or to the third point in time.

Since the second switching element can be closed within a range comprising the switching points in time of the third and first switching elements, it is appropriate to close the second switching element simultaneously with one of the other switching elements; in particular, two switching elements can thus be driven by means of one drive signal. This advantageously simplifies the driving and minimizes the outlay on resources in the control.

In a further embodiment of the invention, a power factor (cos phi) of the electric drive or of the electric machine is taken into account in the predefinition of the points in time at which the respective switching element or the switching elements are closed.

In particular, the drive-specific and aging-dependent phase shift angle resulting from the power factor is correspondingly added to the respective predefined rotor angles and the time ranges or points in time for closing the individual switching elements at which the closing of the respective switching elements is effected are correspondingly adapted.

This advantageously ensures that the power factor is taken into account upon the short-circuiting of the individual phases and, therefore, no overvoltages or overcurrents arise or these are minimized.

It goes without saying that the features, properties and advantages of the method according to the invention correspondingly apply or are applicable to the device according to the invention and respectively to the power converter and the electrically driven motor vehicle, and vice versa.

BRIEF DESCRIPTION OF THE DRAWINGS

Further features and advantages of embodiments of the invention will become apparent from the following description with reference to the accompanying drawings.

The invention will be explained in greater detail below with reference to some figures. In this respect, in the figures.

DETAILED DESCRIPTION

Figure 1:
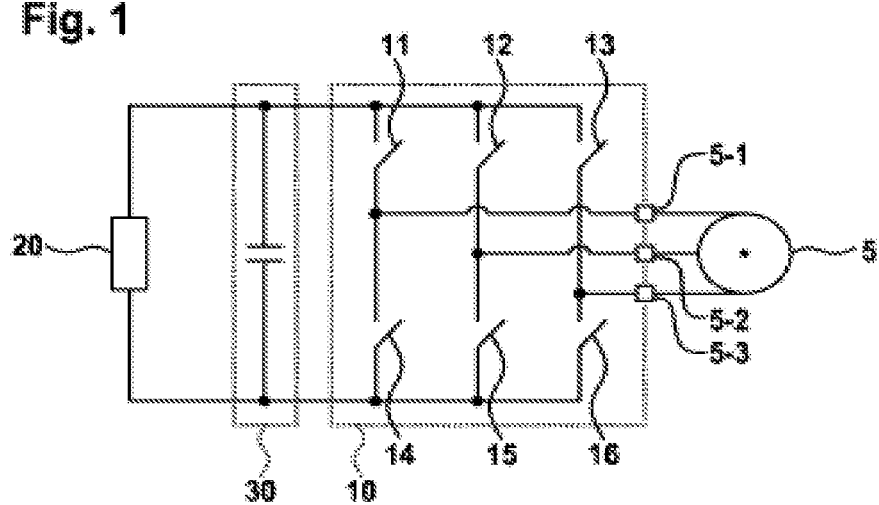
FIG. 1: shows a schematic illustration of a power converter arrangement for operating an electric machine.

In the figures, identical or identically acting functions or functional features and components, unless explained otherwise, are provided in each case with the same reference signs. It goes without saying that components and elements in the drawings are not necessarily reproduced in a manner true to scale, for reasons of clarity.

Further possible configurations and developments and implications of the invention also encompass combinations—not explicitly mentioned—of above—or below—described features of the invention.

FIG. 1 shows a schematic illustration of a power converter arrangement for operating an electric machine 5. The power converter arrangement comprises an energy source 20, such as, for example, a traction battery of an electrically driven motor vehicle, a DC link circuit 30, which comprises in particular a link circuit capacitor, and a power converter 10. The electric machine 5 may be for example a synchronous motor or a synchronous machine.

In this case, the DC link circuit 30 can be arranged in parallel with the outputs of the electrical energy source 20. A power converter 10, for example a pulse-controlled inverter circuit or an inverter, can be connected to the output terminals of the DC link circuit 30. In the present example, the power converter 10 is designed as a full-bridge circuit or B6 bridge. To that end, the power converter circuit 10 comprises upper half-bridge branches having the switching elements 11, 12, 13 and lower half-bridge branches having the switching elements 14, 15, 16. The switching elements 11-16 can comprise power semiconductor switches, for example. In particular, the switching elements 11-16 can comprise for example field effect transistors such as MOSFET, or insulated gate bipolar transistors (IGBT).

By means of corresponding driving of the switching elements 11-16, the power converter 10 can generate a three-phase AC voltage for driving the electric machine 5. For this purpose, a corresponding phase voltage is respectively generated at the phase terminals 5-1, 5-2 and 5-3 of the electric machine 5 by means of the power converter 10.

During normal control operation, it is possible in this way to provide an electrical three-phase voltage at the electric machine 5. Furthermore, for example, by closing the upper three switching elements 11-13 or by closing the lower three switching elements 14-16 at the electric machine 5, it is possible to set the safe operating state of an active short circuit. Furthermore, a further safe operating state in the form of a freewheeling mode is also possible, in which no voltage is applied to the phase terminals 5-1 to 5-3 of the electric machine 5 and, furthermore, the phase terminals 5-1 to 5-3 of the electric machine 5 are electrically isolated from one another. All six switching elements 11-16 are opened in this case.

Figure 2:
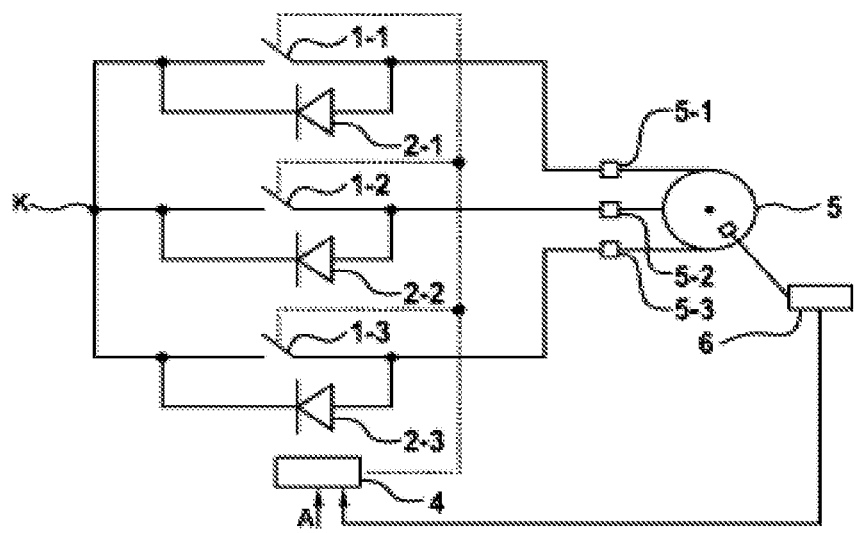
FIG. 2: shows a schematic illustration of a device for changing the operating state of an electric machine in accordance with one exemplary embodiment.

FIG. 2 shows a schematic illustration of a device for changing the operating state of an electric machine 5, such as forms the basis of one embodiment of the present invention. In this case, the electric machine 5 comprises for example three phase terminals 5-1, 5-2 and 5-3. The first phase terminal 5-1 is connected to a node K via a first switching element 1-1. A first freewheeling diode 2-1 is arranged in parallel with the first switching element 1-1. The second phase terminal 5-2 is likewise connected to the node K via a second switching element 1-2. A second freewheeling diode 2-2 is arranged in parallel with the second switching element 1-2. The third phase terminal 5-3 is connected to the node K via a third switching element 1-3. A third freewheeling diode 2-3 is arranged in parallel with the third switching element 1-3. The three switching elements 1-1 to 1-3 may be for example the upper three switching elements 11-13 of the power converter 10 from FIG. 1. The three switching elements 1-1 to 1-3 may likewise be the lower three switching elements 14-16 of the power converter 10 from FIG. 1. In this case, the node K corresponds either to the positive or to the negative connection point of the DC link circuit 30 or the electrical energy source 20.

A rotor angle sensor 6 can be arranged at the rotor of the electric machine and determines the present position of the rotor, that is to say the rotor angle of the electric machine. Alternatively, the present rotor angle can be determined by means of a measured phase voltage or by means of a measured phase current or by means of some other sensor unit. The rotor angle sensor 6 or the alternative sensor unit can furthermore be connected to a drive device 4. Said drive device 4 can furthermore have an input designed to receive a request A for switching the operating state to the short-circuit operating state of the electric machine 5.

After the drive device 4 has received a request A for switching to the short-circuit operating state of the electric machine 5, the drive device 4 evaluates the signals determined by the rotor angle sensor 6 or the alternative sensor unit.

Depending on these signals determined, the drive device 4 thereupon generates control signals for at least partly successively closing the switching elements 1-2, 1-3 and 1-1. After all three switching elements 1-1 to 1-3 have been closed depending on control signals output by the drive device 4, the electric machine 5 is in the safe operating state of the active short circuit.

Figure 3:
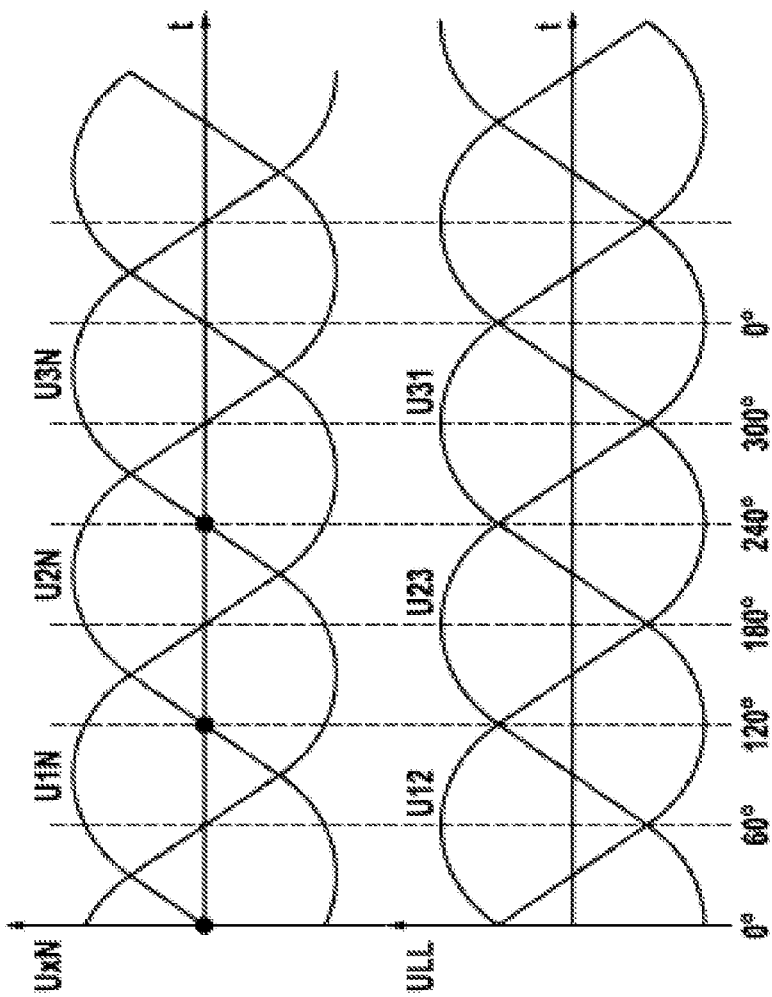
FIG. 3: schematically shows an ideal profile of the induced star voltages and of the conductor voltages against the rotor angle of the electric machine.

FIG. 3 shows a schematic, idealized illustration of the sinusoidal, phase-shifted voltage profiles of the induced star voltages UxN, that is to say U1N, U2N, U3N, of the three phases of the electric machine and also the voltage profiles of the conductor-conductor voltages ULL, that is to say U12, U23, U31, of the phases one above another against the rotor angle of 0 . . . 360° of the electric machine and, in particular, time t.

Figure 4:
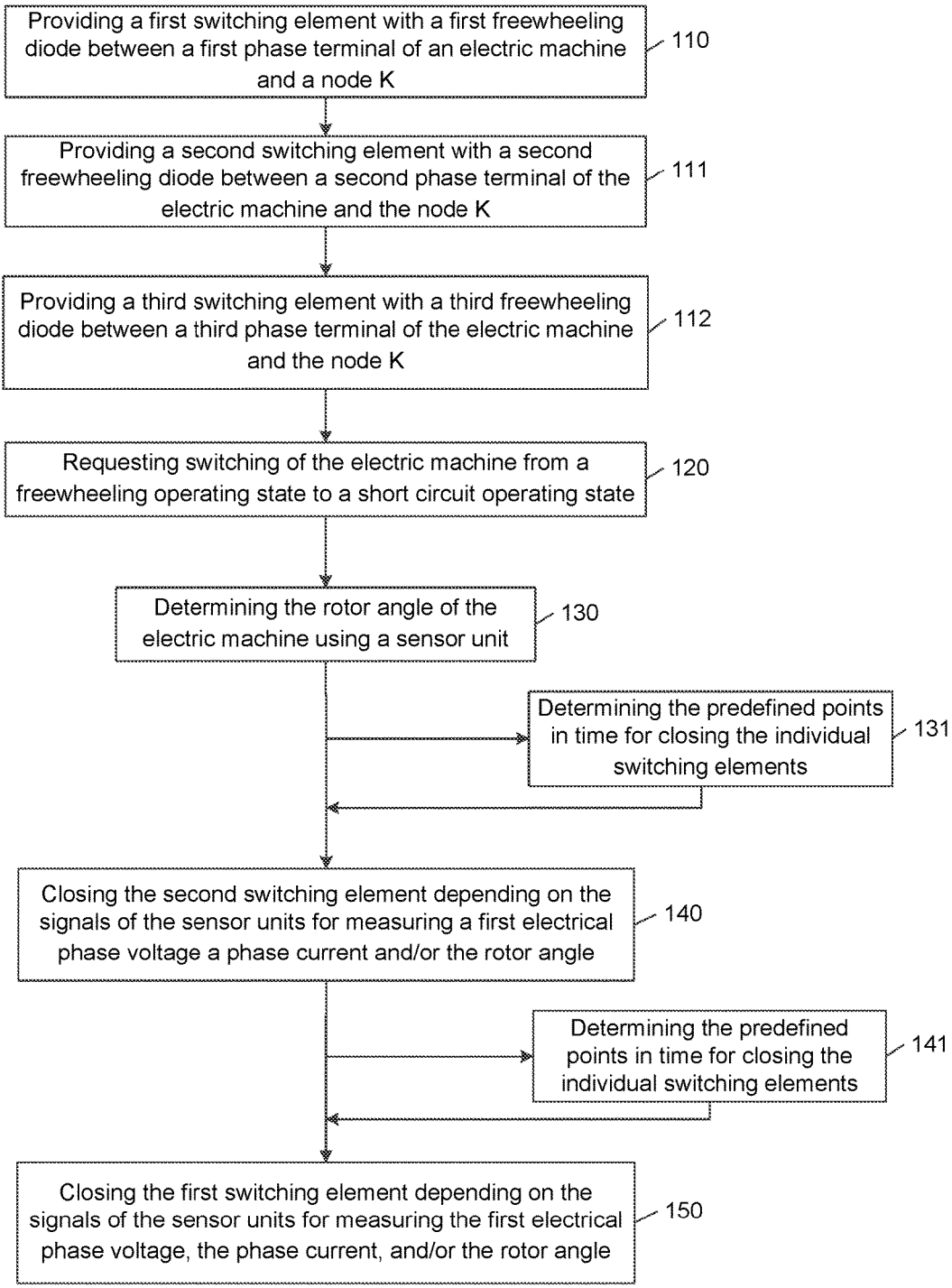
FIG. 4: shows a schematic illustration of a flow diagram for a method such as forms the basis of one exemplary embodiment of the present invention.

FIG. 4 shows a schematic illustration of a flow diagram for a method 100 for switching from the freewheeling operating state of an electric machine 5 to a short-circuit operating state such as forms the basis of one embodiment of the present invention. The method 100 for switching from the freewheeling operating state to a short-circuit operating state in this case firstly provides, in a first step 110 a first switching element 1-1 with a first freewheeling diode 2-1 between a first phase terminal 5-1 of the electric machine 5 and a node K. A further step 111 then involves providing a second switching element 1-2 with a second freewheeling diode 2-2 between a second phase terminal 5-2 of the electric machine 5 and the node K. Furthermore, a step 112 involves providing a third switching element 1-3 with a third freewheeling diode 2-3 between a third phase terminal 5-3 of the electric machine 5 and the node K.

If the electric machine 5 is intended to be transferred from a freewheeling operating state to a short-circuit operating state, then a request for switching the operating state of the electric machine 5 to the short-circuit operating state may be received in step 120. By way of example, said request for switching the operating state of the electric machine 5 to the short-circuit operating state can be effected by the drive device 4 described in association with FIG. 2. In this case, the drive device 4 controls the method steps described in this embodiment and/or the subsequent embodiments.

In a step 130, the rotor angle of the electric machine 5 can be determined by means of a sensor unit, in particular by means of a rotor angle sensor 6. The information or signals of the sensor units for measuring the first electrical phase voltage, the phase current and/or the rotor angle can be provided at the drive device 4. The drive device 4 drives, by means of a drive signal the closing of the third switching element 1-3 at a point in time at which the rotor is situated in a position, that is to say the rotor angle corresponds to a value for which a first induced star voltage U1N changes in a rising manner from the negative to the positive voltage range, or passes through the zero crossing. This relationship between the rotor angle and the voltage profile or current profile is drive-specific and can be physically calculated or measured with the aid of a drive model.

In step 140, the drive device 4 drives, by means of a drive signal, the closing of the second switching element 1-2 depending on the signals of the sensor units for measuring the first electrical phase voltage, the phase current and/or the rotor angle.

In step 150, the drive device 4 drives, by means of a drive signal, the closing of the first switching element 1-1 depending on the signals of the sensor units for measuring the first electrical phase voltage, the phase current and/or the rotor angle. The first switching element 1-1 is closed if the signal corresponds to a value which corresponds to a rotor angle of between 0 and 180°, in particular 50° and 130°. The greater the deviation of the switching point in time of the first switching element 1-1 from the point in time at which the rotor angle is the value 90°, the more severe the current and voltage overshoots that occur. The smaller the deviation of the switching point in time from the point in time at which the rotor angle is the value 90°, the smaller the current and voltage overshoots that occur.

With this method, therefore, all the switching elements 1-1 to 1-3 are not closed simultaneously, but rather successively at at least two successive points in time, such that no significant voltage or current boosting occurs.

In a further embodiment, an additional step 131 and/or 141 may be provided when determining the points in time to be predefined for closing the individual switching elements. When determining the different points in time at which the corresponding rotor angles are present relative to which the respective switching element or switching elements is/are intended to be closed, the power factor of the electric drive or of the electric machine is taken into account. In particular, the phase shift angle resulting from the power factor is correspondingly added to the respective predefined values of the rotor angle at which the closing of the respective switching elements is intended to be effected.

If consideration is given to an ideal system, disregarding the ohmic losses of an electric machine, the following relationships result. The electric machine is considered to be a purely inductive load. Consequently, the current profile through impedance of the electric machine lags behind the voltage profile by 90°. Consequently, at the point in time at which the magnitude of the voltage across the impedance of a phase is maximal a zero crossing of the current through the impedance and thus through this phase arises. This is the optimum point in time for closing the switching element of this phase since no current flow is adversely affected by the switching-on.

At the start of a two-phase system, for example with third and second phases, in this regard two conditions arise: in order that the second freewheeling diode 2-2 can carry current, the voltage present must be negative. To that end, the conductor-conductor voltage U23 must be negative. In accordance with the conductor-conductor voltage profile illustrated in FIG. 3, this first condition is met if the rotor angle fulfills a value of between 270° and 90°. The second condition is that no current flows via the freewheeling diode 2-1 since, after all, firstly a two-phase system, for example consisting of second and third phases, is intended to be created. To that end, it is necessary to fulfill the situation where the voltage US1 across the switching element 1-1 is likewise less than zero.

The following holds true in this respect:

$$US1 = US3 - UZ3 + U3N - U1N + UZ1 < 0 \quad (1)$$

Assuming that the switching element 1-3 is closed first, US3=0. The voltage UZ1 across the impedance of phase 1 is likewise zero since no current flows in phase one at the start of the two-phase system comprising second and third phases. Under the further assumption that the impedances of the three phases are of identical magnitude, the voltage in the two-phase system is divided uniformly through the impedances UZ2 and UZ3 of the phases. The following thus results from equation (1):

$$US1 = 0 - 0.5(U3N - U2N) + U3N - U1N + 0 = 0.5U23 + U31 < 0 \quad (2)$$

In accordance with the conductor-conductor voltage profile illustrated in FIG. 3, this second condition is met between 0° and 90°.

Consequently, by way of example, the resulting optimum point in time for closing the third switching element 1-3 is the rotor position angle of 0° or the positive zero crossing of the induced star voltage U1N of phase one, that is to say when the profile of the induced star voltage U1N crosses from the negative voltage range into the positive voltage range.

For the further step where the current flow undergoes transition to the steady-state settled three-phase profile, closing of the switching element 1-1 is necessary. This is intended to take place before the point in time at which the freewheeling diode 2-1 would automatically become conducting if a corresponding voltage were present. The expedient point in time thus again results when the magnitude of the voltage UZ1 across the impedance of the phase is maximal. A zero crossing of the current through the impedance and thus through the first phase is then once again present. This is the optimum point in time for switching on since no current flow is adversely affected by the switching on.

It holds true here that, at the point in time of switching on the switching element 1-1 the voltage US1 present at the switching element 1-1 jumps across to the voltage UZ1 present at the impedance of phase one. The following thus holds true:

$$UZ1=-US1 \quad (3)$$

Since UZ1 is intended to be maximal it follows that US1 will be minimal. Taking account of equation (2), the following emerges:

$$US1=0.5*U23+U31=\text{minimum} \quad (4)$$

This is achieved at 90°, as is also evident from the conductor-conductor profile illustrated in FIG. 3. Experiments have revealed that it is also possible to switch on the first switching element 1-1 in a range of 0 to 180°. However, deviations from the ideal point in time lead to current and voltage overshoots.

The switching element 1-2 must be closed at the latest when the freewheeling diode 2-2 would no longer conduct the current. In a departure from this optimum point in time, in particular the switching element 1-2 can also be closed a short time later. Driving and closing the second switching element 1-2 simultaneously with the third switching element 1-3 or simultaneously with the first switching element 1-1 is a technical simplification.

The explanations above are based on a theoretical consideration under the assumption that the electric machine would be a purely inductive load. Since, in reality, the impedance of the electric machine also has resistive components, optimum points in time or rotor angles for switching on the switching elements result from calculations and experiments. A point in time for closing the third switching element at which the rotor angle is 165°, for example, is suitable for creating the two-phase system. A point in time for closing the first switching element at which the rotor angle is 260°, for example, is suitable for creating the three-phase system, or the short circuit. However, a deviation of +/−10° from these values also still yields a satisfactory result for which the overshoots are minimized. The optimum points in time and values corresponding thereto for the rotor angle for closing the switching element 1-1 to 1-3 can be determined depending on the type of machine used, the rotational speed and the temperature.

The invention claimed is:

1. A method for switching from a freewheeling operating state of an electric machine having three phase terminals to a short-circuit operating state, the method comprising:

providing a first switching element with a first freewheeling diode between a first phase terminal of the electric machine and a node;

providing a second switching element with a second freewheeling diode between a second phase terminal of the electric machine and the node;

providing a third switching element with a third freewheeling diode between a third phase terminal of the electric machine and the node;

receiving a request for switching the operating state of the electric machine from the freewheeling operating state to the short-circuit operating state;

closing the third switching element and the second switching element at least partly successively at points in time predefined depending on a drive parameter of the electric machine, or closing the second switching element simultaneously with the third switching element to transition from the freewheeling operating state to a partial-phase short circuit operating state having only two phase terminals conductively connected to one another, and closing the first switching element at a point in time predefined depending on the drive parameter of the electric machine to transition from the partial-phase short circuit operating state to the short circuit operating state having each of the three phase terminals conductively connected to each other, wherein the drive parameter of the electric machine is a value or a profile of an electrical voltage of the electric machine or a rotor angle of the rotor of the electric machine or another parameter on the basis of which a value or a profile of an electrical voltage of the electric machine or the rotor angle of the rotor of the electric machine can be deduced.

2. The method as claimed in claim 1,
wherein the third switching element is closed at a first point in time, at which the drive parameter corresponds to a value which corresponds to a rotor angle from the range of 320° to 40°.

3. The method as claimed in claim 2, wherein a power factor of the electric drive is taken into account in the predefinition of the different points in time at which the switching elements are closed.

4. The method as claimed in claim 1,
wherein the second switching element is closed at a second point in time, at which the drive parameter corresponds to a value which corresponds to a rotor angle from the range of 320° to 130°.

5. The method as claimed in claim 1,
wherein the first switching element is closed at a third point in time, at which the drive parameter corresponds to a value which corresponds to a rotor angle from the range of 50° to 130°.

6. The method as claimed in claim 1,
wherein the second switching element is closed at a second point in time corresponding to the first point in time or to the third point in time.

7. A computer program configured to perform a method as claimed in claim 1.

8. A machine-readable storage medium comprising the computer program as claimed in claim 7.

9. The method as claimed in claim 1, wherein the closing of the switching elements at the points in time predefined depending on the drive parameter of the electric machine includes the closing of the switching elements at the points in time when voltage across the impedance of a phase is maximal corresponding to a zero crossing of current through the impedance.

10. The method as claimed in claim 1, wherein the value or the profile of the electrical voltage is maximal for the closing of the switch elements.

11. A device for switching from a freewheeling operating state of an electric machine comprising three phase terminals to a short-circuit operating state, the device comprising:
a first switching element, which is designed to electrically connect a first phase terminal of the electric machine to a node, wherein the first switching element comprises a first freewheeling diode;
a second switching element, which is designed to electrically connect a second phase terminal of the electric machine to the node, wherein the second switching element comprises a second freewheeling diode;
a third switching element, which is designed to electrically connect a third phase terminal of the electric machine to the node, wherein the third switching element comprises a third freewheeling diode;
a drive device, which is configured to receive a request for switching the operating state of the electric machine to the short-circuit operating state, and to output control signals for closing the third switching element and the second switching element at least partly successively at points in time predefined depending on a drive parameter of the electric machine, or closing the second switching element simultaneously with the third switching element, to
transition from the freewheeling operating state to a partial-phase short circuit operating state having only two phase terminals conductively connected to one another, and the drive device is configured to output control signals for closing the first switching element at a point in time predefined depending on the drive parameter of the electric machine to transition from the partial-phase short-circuit operating state to the short circuit operating state having all three phase terminals conductively connected to each other,
wherein the drive parameter of the electric machine is a value or a profile of an electrical voltage of the electric machine or a rotor angle of the rotor of the electric machine or another parameter on the basis of which a value or a profile of an electrical voltage of the electric machine or the rotor angle of the rotor of the electric machine can be deduced.

12. A power converter comprising a device for switching from a freewheeling operating state to a short-circuit operating state of an electric machine as claimed in claim 11.

13. An electrically driven motor vehicle comprising a device for switching from a freewheeling operating state to a short-circuit operating state of an electric machine as claimed in claim 11.

14. The device as claimed in claim 11, wherein the output control signals for closing the switching elements at least partly successively at the points in time that are predefined depending on the drive parameter of the electric machine, are predefined to when voltage across the impedance of a phase is maximal corresponding to a zero crossing of current through the impedance.

15. A device for switching from a freewheeling operating state of an electric machine comprising three phase terminals to a short-circuit operating state, the device comprising:
a first switching element configured to electrically connect a first phase terminal of the electric machine to a node, wherein the first switching element includes a first freewheeling diode;
a second switching element configured to electrically connect a second phase terminal of the electric machine to the node, wherein the second switching element includes a second freewheeling diode;
a third switching element configured to electrically connect a third phase terminal of the electric machine to the node, wherein the third switching element includes a third freewheeling diode; and
a drive device configured to receive a request for switching the operating state of the electric machine to the short-circuit operating state, and to output control signals for closing the third switching element and the second switching element at least partly successively at points in time predefined depending on a drive parameter of the electric machine, or closing the second switching element simultaneously with the third switching element, to
transition the electrical machine from the freewheeling operating state to a partial-phase short circuit operating state having only two phase terminals conductively connected to one another, and closing the first switching element at a point in time predefined depending on the drive parameter of the electric machine to transition from the partial-phase short circuit operating state to the short circuit operating state having all three phase terminals conductively connected to each other,
wherein the drive parameter of the electric machine is a value or a profile of an electrical voltage of the electric machine or a rotor angle of the rotor of the electric machine or another parameter on the basis of which a value or a profile of an electrical voltage of the electric machine or the rotor angle of the rotor of the electric machine can be deduced.

16. The device as claimed in claim 15, further including a rotor angle sensor configured to determine the rotor angle of the rotor of the electric machine, wherein the rotor angle sensor is connected to the drive device, and wherein the drive parameter of the electric machine is the rotor angle.

17. The device as claimed in claim 15, wherein the closing of the switching elements at the points in time predefined depending on the drive parameter of the electric machine includes the closing of the switching elements at the points in time when voltage across the impedance of a phase is maximal corresponding to a zero crossing of current through the impedance.

* * * * *